United States Patent [19]

Tsuji

[11] Patent Number: 5,077,615
[45] Date of Patent: Dec. 31, 1991

[54] HALFTONE IMAGE RECORDING APPARATUS COMBINING ERROR SCATTERING AND MULTI-LEVEL TONE CONVERSION TECHNIQUES

[75] Inventor: Katsuhisa Tsuji, Yokohama, Japan
[73] Assignee: Ricoh Company, Ltd., Tokyo, Japan
[21] Appl. No.: 570,774
[22] Filed: Aug. 22, 1990
[30] Foreign Application Priority Data Aug. 24, 1989 [JP] Japan .................................. 1-217692

[51] Int. Cl.$^5$ .......................... H04N 1/23; H04N 1/40
[52] U.S. Cl. .................................... 358/298; 358/456; 358/457; 358/461; 358/466
[58] Field of Search ...................... 358/298, 455–461, 358/465, 466

[56] References Cited

U.S. PATENT DOCUMENTS 4,654,721 3/1987 Goertzel ............................ 358/459
4,969,052 11/1990 Ishida ................................ 358/457

Primary Examiner—Benjamin R. Fuller
Assistant Examiner—Scott A. Rogers
Attorney, Agent, or Firm—Oblon, Spivak, McClelland, Maier & Neustadt

[57] ABSTRACT

An image recording apparatus reproduces a halftone image with high resolution by using a systematic diether method and an error scattering method. Sharpness of an image to be reproduced is selectively variable.

8 Claims, 18 Drawing Sheets

ORIGINAL IMAGE DATA

INPUT IMAGE DATA

HALFTONE IMAGE RECORDING APPARATUS COMBINING ERROR SCATTERING AND MULTI-LEVEL TONE CONVERSION TECHNIQUES

BACKGROUND OF THE INVENTION

The present invention relates to an image recording apparatus capable of recording a halftone image with high resolution.

A systematic dither method is an implementation available with a digital copier or similar image recording apparatus for reproducing an image having shades or halftone image. With a systematic dither method, however, it is difficult to reproduce image portions where the density sharply changes. For example, such a dither method blurs the edges of a two-level image such as a character or a line. Moreover, when a halftone image or dot image on a printing or similar matter is reproduced by the above-mentioned method, the periodic pattern of the dots and the dither pattern interfere with each other to cause moire to appear. An error scattering method (average error minizing method) is another conventional method which has relatively high resolution, as disclosed in Japanese patent laid-open publication No. 5677/1986, for example. The error scattering method is such that a threshold for a pixel of interest included in an input image is determined in consideration of the levels of surrounding pixels. Generally, the systematic dither method promotes easy control over tone characteristics, but it is not satisfactory in resolution. On the other hand, the error scattering method is excellent in resolution, but it cannot readily control tone characteristics. In the light of this, there has been proposed an image processing method which determines whether an original image is a photographic image portion with continous tones (tone image area) or a character, line or similar image (two-level image) and, depending on the result of decision, selects either one of the systematic dither method or the error scattering method. This kind of method is taught in, for example, Japanese patent laid-open publication Nos. 19872/1989 and 19873/1989.

Recently, a laser printer capable of recording a dot with any of several density levels has been reported, which is a remarkable improvement over the traditional black-and-white printing. Dither patterns for implementing the systematic dither method have been developed in relation to such an advanced laser printer. However, among the problems particular to the systematic dither method, the moire problem is still left unsolved. Specifically, actual tone processing has to be preceded by an extra step of smoothing input data in order to remove the periodic components of dots. Such an extra step or preprocessing prevents the resolution of the system from being fully availed in the event of reproduction of a dot image. Even with error scattering method, the stripe pattern particular to two-level processing cannot be eliminated when a single output pixel is associated with single input pixel. Moreover, a false contour appears unless the multi-level output level is stable.

SUMMARY OF THE INVENTION

It is therefore an object of the present invention to provide an image recording apparatus capable of recording a halftone image with high resolution.

It is another object of the present invention to provide an image recording apparatus capable of selectively changing sharpness of an image to be reproduced.

It is another object of the present invention to provide a generally improved image recording apparatus.

In one aspect of the present invention, an image recording apparatus comprises an adding section for outputting a dither-processed signal by superposing on each two-dimensionally distributed m×n pixel group of an input image signal representative of tones m×n adjusting levels on a pixel-by-pixel basis, an error correcting section for outputting an error scattered image signal by applying to the dither-processed signal a correction matching a signal level error between an input and an output of a pixel whose recording level has already been determined, a multi-level converting section for converting the error scattered image signal into a multi-level tone recording signal by using at least two threshold levels, and a recording section for recording an image represented by the tone recording signal.

In another aspect of the present invention, an image recording apparatus comprises an error correcting section for outputting an error scattered image signal by applying to an input image signal reprentative of tones a correction matching a signal level error between an input and an output of a pixel whose recording level has already been determined, a dither/multi-level converting section for converting the error scattered image signal into a tone recording signal by processing each group of two dimensionally distributed m×n pixels of the image signal by corresponding threshold values of at least two threshold value groups each comprising m×n threshold values, and a recording section for recording an image represented by the tone recording signal.

In still another aspect of the present invention, an image recording apparatus comprises an error correcting section for outputting an error scattered image signal by applying to an input image signal representative of tones a correction matching a signal level error between an input and an output of a pixel whose recording level has already been determined, a multi-level converting section for converting the error scattered image signal into a multi-level tone recording signal by comparing the error scattered image signal with a plurality of threshold values having a distance which is smaller than a distance of recording levels, and a recording section for recording an image represented by the multi-level tone recording signal.

In a further aspect of the present invention, an image recording apparatus comprises an error correcting section for outputting an error scattered image signal in response to an input image signal representative of tones, a multi-level converting section for converting the error scattered image signal into a multi-level tone recording signal by using at least two threshold values, a tone detecting section responsive to the input image signal for determining whether an image represented by the input image signal is a tone image area or a two-level image area, a selecting section for selecting sharpness of an output image, a multi-level threshold setting section for feeding to the multi-level converting section threshold values associated with determination by the tone detecting section and selection by the selecting section, and a recording section for recording an image represented by the multi-level tone recording signal.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

The error scattering method will be described specifically. Assume that a single pixel of an input image has a pixel level $X_{ij}$ (i, j: coordinates in the image) which lies in a standardized range of 0 to 1, and that the corresponding output has a pixel level $Y_{ij}$ which is either 0 or 1, i.e. ON or OFF. The error $e_{ij}$ between the input and the output is expressed as:

$$e_{ij} = X_{ij} - Y_{ij} \tag{1}$$

The value which $Y_{ij}$ may have is more discrete than that which $X_{ij}$ may have, i.e., the number of tones which may be represented by the output is smaller than the number of tones which may be represented by the input. On the entry of a pixel signal $X_{ij}$ of interest, correction is effected by using the errors of surrounding pixels whose output values have already been determined, as follows:

$$X_{ij}' = X_{ij} + 1/(\Sigma \alpha kl) \cdot \Sigma(\alpha Kl \cdot e_{i+kj+l}) \tag{2}$$

where $\alpha kl$ is a weighting coefficient and is an element of a matrix. An example of $\alpha kl$ is $$\alpha = \begin{pmatrix} 1 & 3 & 5 & 3 & 1 \\ 3 & 5 & 7 & 5 & 3 \\ & 5 & 7 & * & \end{pmatrix} \tag{3}$$

where "*" indicates the position of the piel $X_{ij}$ of interest. The output value $X_{ij}$ is determined by preparing a group of necessary m threshold values by use of $X_{ij}'$ of the equation (2). Assuming that m threshold values are T1 to Tm, then $$Y_{ij} = T_m \quad \text{if } X_{ij}' \geq T_m$$
$$Y_{ij} = T_{m-1} \quad \text{if } T_m > X_{ij}' \geq T_{m-1}$$

$$Y_{ij} = T_1 \quad \text{if } T_2 > X_{ij}' > T_1$$
$$Y_{ij} = 0 \quad \text{if } T_1 > X_{ij}'$$

The threshold value Ti (i = 1, 2, ..., m) depends on the number of output tones; m threshold values are needed for m+1 tones. For example, to determine an eight-level output, it will be compared with seven threshold values.

Figure 1:
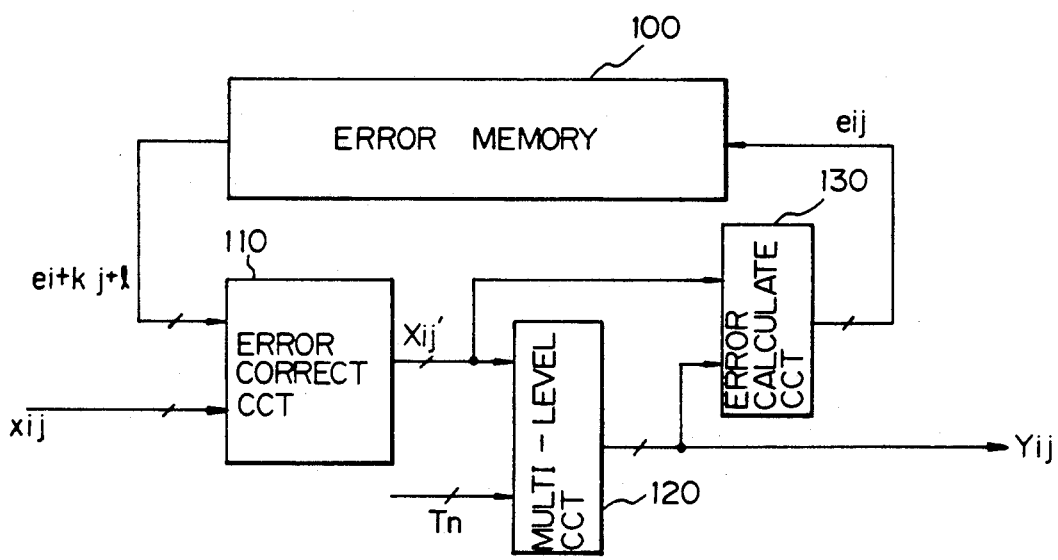
FIGS. 1 and 2 are block diagram schematically showing a prior art image processing circuit.

FIG. 1 shows a prior art image processing apparatus for executing the procedure described above. As shown, on receiving data $X_{ij}$ representative of a pixel of interest, an error correcting circuit 110 produces $X_{ij}'$ by using the equation (2). The error correcting circuit 110 has multipliers, adders and latches for multiplication and addition of the errors $e_{i+kj+l}$ of the surrounding pixels and weighting coefficients $\alpha kl$ and for the addition of the results and $X_{ij}$. When the matrix $\alpha$ is selected such that the coefficients and $\Sigma \alpha kl$ are the powers of 2, as represented by an equation (5) below, multiplications and divisions can be implemented only by bit shifting operations and, therefore, multipliers which are expensive are not necessary.

$$\alpha = \begin{pmatrix} 0 & 0 & 1 & 0 \\ 0 & 1 & 2 & 1 \\ & 1 & 2 & * & \end{pmatrix} \tag{5}$$

Figure 2:
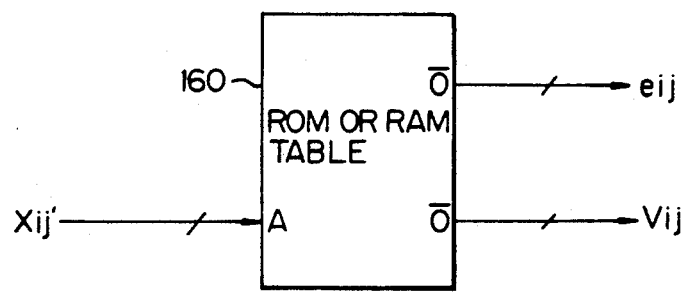

A multi-level circuit 120 compares Xij' with a plurality of threshold values $T_i$ to thereby determine an output value Yij. The multi-level circuit 120 is implemented with a plurality of comparators, while the error correcting circuit 130 is implemented with a subtractor and produces a difference between Xij' and Yij, i.e. error eij. The resulting error eij is written to an error memory 100 and used to correct a pixel whose output value is to be determined. The multi-level circuit 120 and error correcting circuit 130 will be simplified if use is made of a ROM table or a RAM table 160 as shown in FIG. 2. Specifically, by writing Yij and eij resulting from the comparison of predetermined $T_i$ and Xij' to the location of the ROM or RAM table 160 which is addressed by a ROM address signal, or Xij', it is possible to executed the multi-level and error calculate processing at high speed with reference to the table.

An input image signal is often implemented as a signal which is linearly related to the density values close to the stimulus values of human being. However, the error scattering method effects addition and substraction with an image signal in the event of calculating an error and a corrected value. Since the density value is the cologarithm of a reflectance (or transmittance), the sum and difference of density values are vague when it comes to physical meaning. On the other hand, reflectance varies linearly with the area ratio of an area which is substantially rendered in black, it has meaning in relation to sums and differences. In the error scattering method, therefore, the reproducibility of an output value will be controlled more strictly relative to an input if use is made of an image signal whose reflectance is linear. Nevertheless, when the control over the absolute value of the output is not necessary and consideration is given only to the relative values of pixels, a signal having a density linear or similar characteristic may be used. More specifically, it is not necessary to be particular to the characteristic of an image signal when the prerequisite is simply reproducing the variation in the density of an image smoothly.

Figure 3:
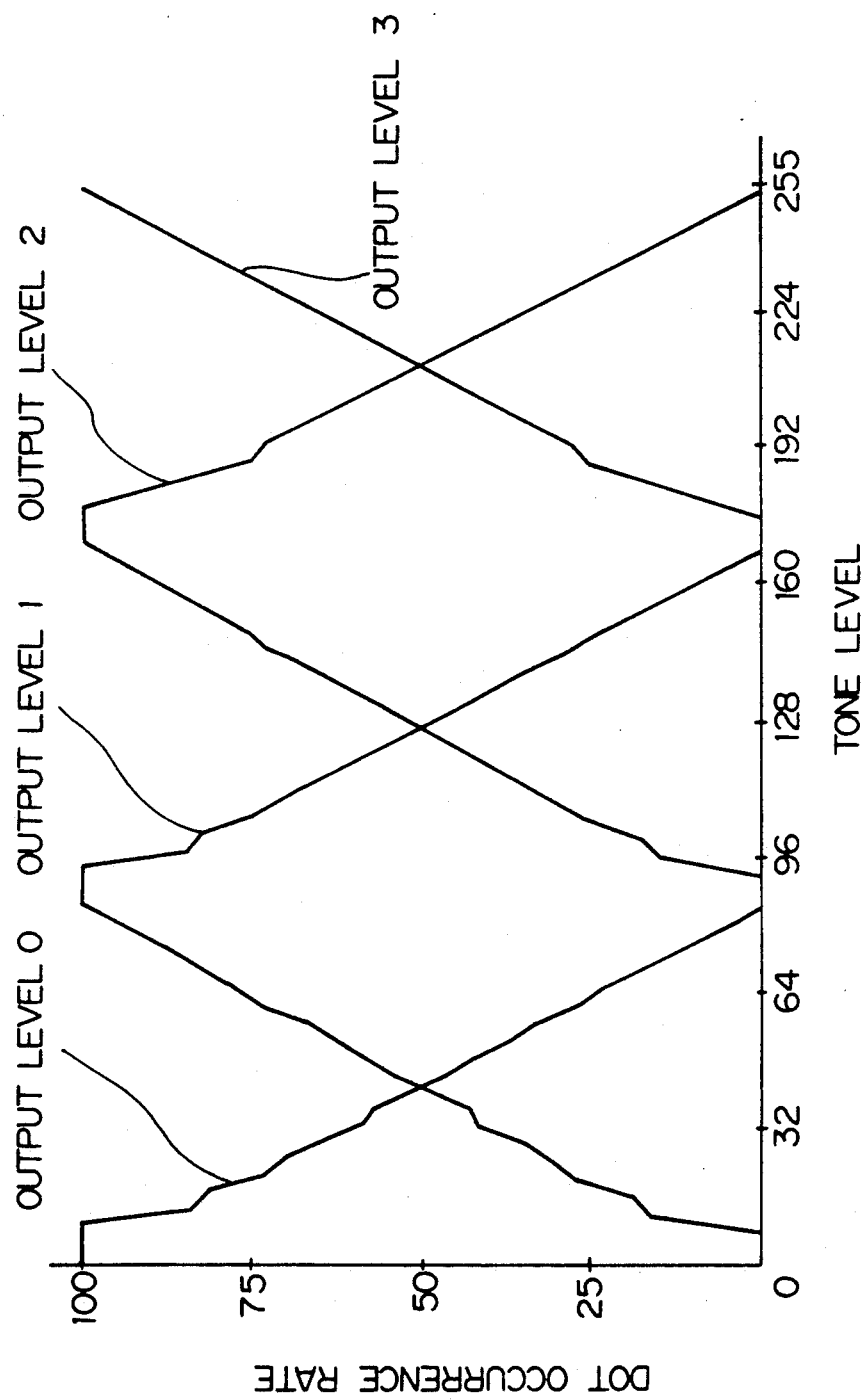
FIG. 3 shows a dot construction (occurrence rate) of four kinds of output levels associated with input levels which are observed when electrically generated gray scale is converted into four levels by the circuit of FIG. 1 and the error spreading method.

The prior art multi-level error scattering method renders a tone by using a dot having two output levels which are close to the density levels of an image. FIG. 3 shows the dot construction (occurrence rate) of four different output levels relative to input tone levels which were determined by processing electrically generated gray scale into four levels by the error scattering method. Parameters $T1=85$, $T2=170$ and $T3=255$ and the error weighting matrix $\alpha$ represented by the formula (3) were used. Concerning the gray scale data, the pixel size is 320 pixels per line in the main scanning direction and 256 lines in the subscanning direction. The input level does not change in the main scanning direction, but it increases in the subscanning direction by 1 every line (0 on the first line). More specifically, the input level is 255 on the 256th line.

The dot occurrence rate associated with each output level is plotted by averaging each four lines (four tones). As FIG. 3 indicates, a certain tone is rendered by using only two kinds of dots whose output values are close to the tone of interest. When the input level data are close to the individual output values of the output dots (in FIG. 3, around 0, 85, 170, and 255), tones are rendered only by the dots of the individual output levels. In the case that tones are rendered by such few kinds of dots, unstable output values of the individual dots would cause the tone to jump at and around the levels where the kind of dot to be use changes and would thereby cause a false contour to appear. When the number of output levels is not greater than three or four, the cumulative error is apt to fail to exceed the difference between output levels and, therefore, the area rendered by dots of a single level is apt to increase. Even when a physically mean density level continues, the area rendered by dots of a single output level is recognized as a false contour since it is noticeably different in texture from the surrounding area which is rendered by two kinds of density levels. Another problem is that black dots and white dots are apt to stand alone in low density areas and high density areas, respectively. In the case of a laser printer or similar output unit in which the stability of dots is relatively low, frequent occurrence of isolated dots directly translates into poor repetitive reproducibility and tone characteristic of an output image.

Before entering into detailed description of the present invention, an image recording apparatus to which the present invention is applicable will be described with reference to FIG. 4.

Figure 4:
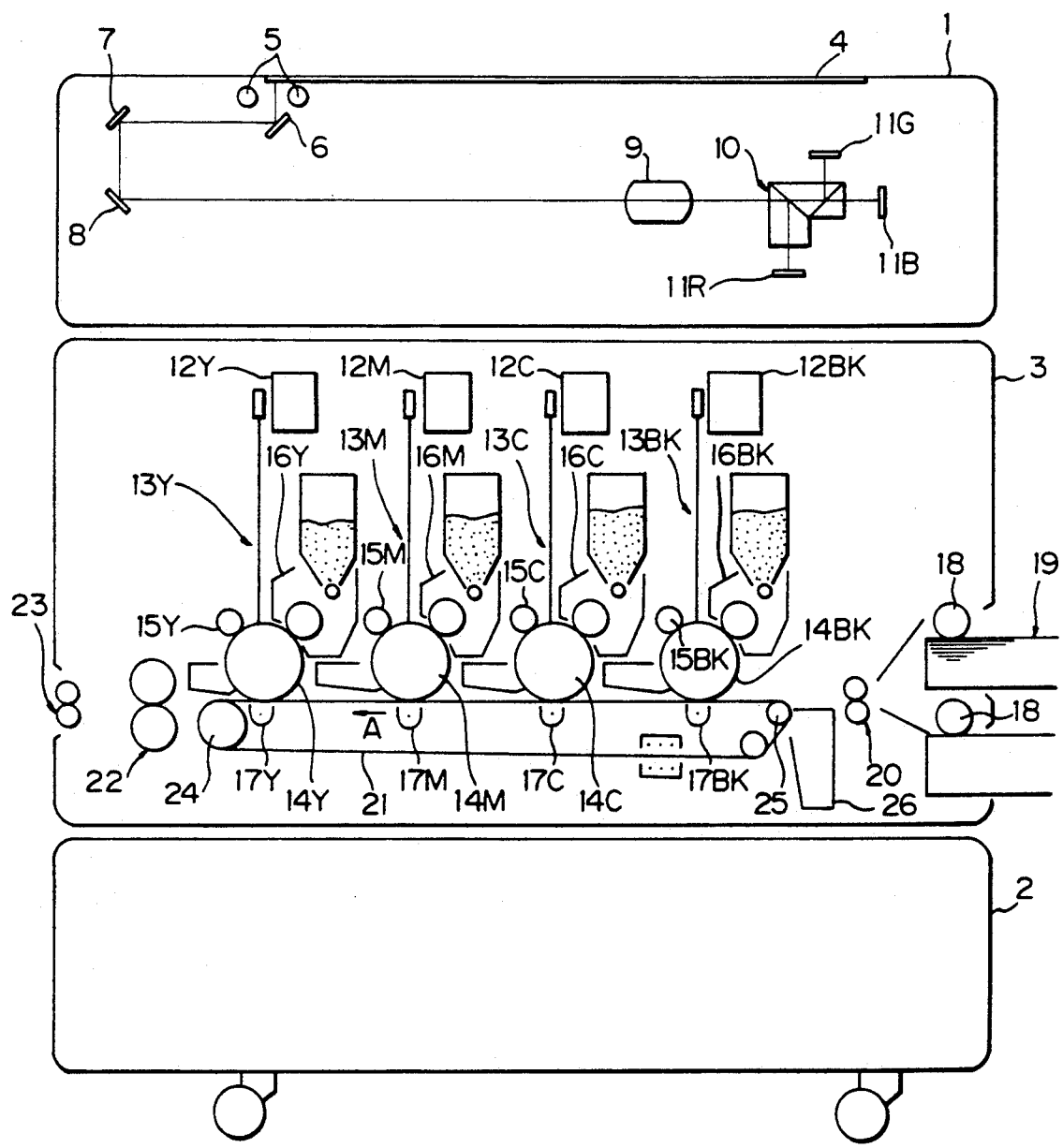
FIG. 4 is a side elevation showing a specific construction of a digital color copier belonging to a family of image recording apparatuses to which the present invention is applicable.

In FIG. 4, the image recording apparatus is implemented as a digital color copier by way of example and includes a scanner section 1. While the scanner section 1 produces a digital image signal representative of a document, an image processing section 2 processes the image signal electrically. A printer section 3 prints out an image on a paper sheet in response to color-by-color image data which is fed thereto from the image processing section 2. The scanner section 1 has a fluorescent lamp or similar lamp 5 for illuminating a document which is laid on a glass platen 4. A reflection from the document is steered by mirrors 6, 7 and 8 to reach a lens 9. The lens 9 focuses the incident imagewise reflection onto a dichroic prism 10. In response, the dichroic prism 10 separates the incident imgewise light into, for example, a red (R) component, a green (G) component, and a blue (B) component each having a particular wavelength. The R, G and B components are incident to CCDs (Charge Coupled Devices) 11R, 11G and 11B, respectively. The CCDs 11R, 11G and 11B each transforms the incident color component into a digital signal. The image processing section 2 performs necessary processing with the outputs of the CCDs 11R, 11G and 11B to convert them into print data of different colors, e.g. black (Bk), yellow (Y), magenta (M), and cyan (C).

While the specific arrangement shown in FIG. 4 renders an image in four colors Bk, Y, M and C, a color image may be rendered in only three colors by omitting any one of four recording devices 13Y, 13M, 13C and 13Bk which will be described.

The output signal of the image processing section 2 is fed to the printer section 3, i.e., to laser beam emitting units 12Bk, 12C, 12M and 12Y assigned to the individual colors. In FIG. 4, the printer section 3 is shown as having four recording devices 13Y, 13M, 13C and 13Bk arranged side by side. Since all the recording devices 13Y to 13Bk have the same construction, the following description will concentrate on the recording device 13C by way of example. In the figure, the same reference numerals designate corresponding portions while suffixes are used to distinguish the corresponding portions from one another with respect to color.

The recording device 13C has a photoconductive element 14C in addition to the laser emitting unit 12C. In FIG. 4, the photoconductive element 14C is implemented as a drum. Arranged around the drum 14C are a main charger 15C, an exposing and developing unit 16C, a transfer charger 17C and other units which are conventional with a copier. The drum 14C is uniformly charged by the main charger 15C and then scanned by the laser beam issuing from the emitting unit 12C. As a result, a latent image associated with a cyan component is formed on the drum 14C. The developing unit 16C develops the latent image to turn it into a toner image. A paper sheet is fed from a paper feed section 19, e.g., one of two paper cassettes by a feed roller 18 to a register roller pair 20. The register roller pair 20 drives the paper sheet at a predetermined timing to a transfer belt 21. The transfer belt 21 sequentially transports the paper sheet past the drums 14Bk, 14C, 14M and 14Y. The transfer chargers 17Bk, 17C, 17M and 17Y each transfers the toner image from the associated drum to the paper sheet. The resultant composite color image on the paper sheet is fixed by a fixing roller pair 22. Thereafter, the paper sheet is driven out of the copier by a discharge roller pair 23. In this instance, the paper sheet is electrostatically retained by the transfer belt 21 and, therefore, transported accurately at the speed of the belt 21. Passed over a drive roller 24 and a driven roller 25, the transfer belt 21 is moved in a direction indicated by an arrow A. A cleaning unit 26 removes toner particles remaining on the transfer belt 21 after the image transfer. Pattern image sensing means in the form of a reflection type sensor, not shown, is associated with the drum 14 at the downstream side with respect to the direction A.

Figure 5:
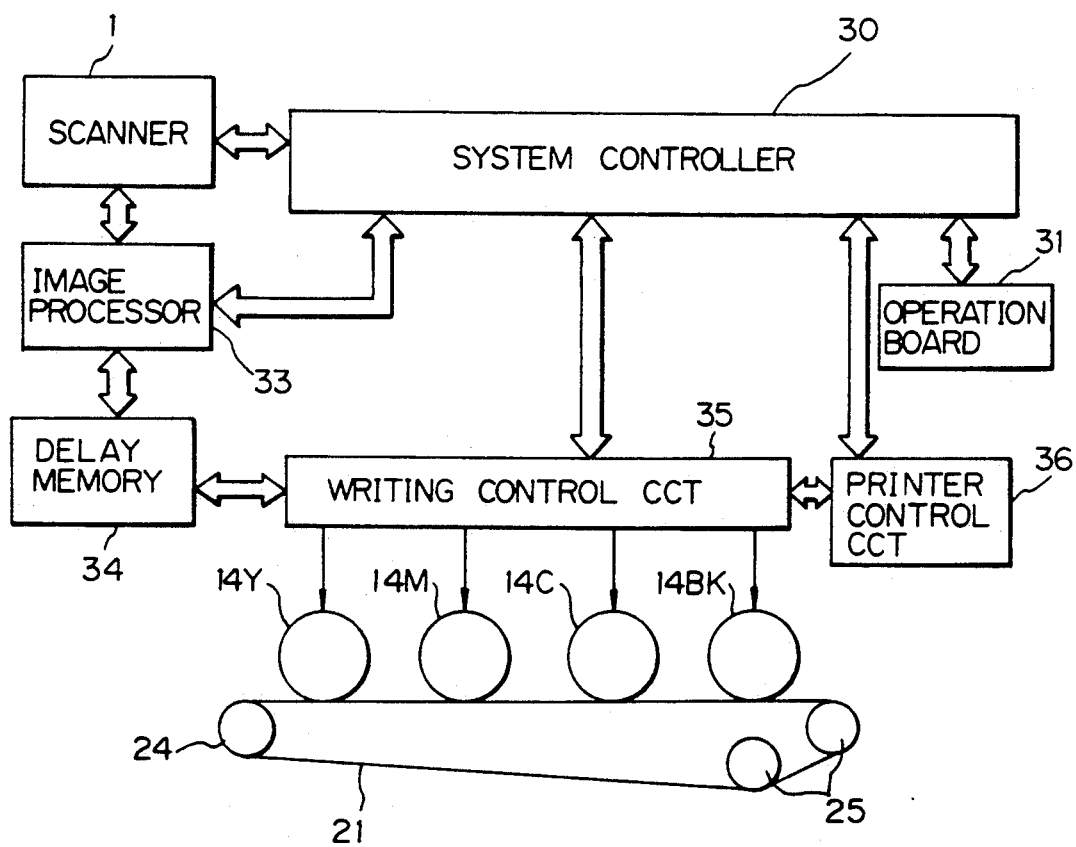
FIG. 5 is a block diagram schematically showing a control system for controlling the copier of FIG. 4.

FIG. 5 shows a control system for controlling the digital copier of FIG. 4. In the figure, a system controller 30 controls the scanner section 1, image processing section 2, and printer section 3. Specifically, the control includes display control and key input processing associated with an operation board 31, and the control over the entire system which is effected on the basis of various modes selected on the operation board 31 and by feeding start signals and magnification signals to the scanner section 1 and printer section 3, feeding an image processing mode signal (color conversion, masking, trimming, mirroring, etc.) to the image processing section, and receiving error signals and status signals (Wait, Ready, Busy, Stop, etc.) from the individual sections or modules 1, 2 and 3.

The scanner section 1, FIG. 4, scans a document at a speed matching a magnification change ratio represented by a start signal from the system controller 30, reads the document image with CCDs or similar reading devices, and feeds the resultant R, G and B image data to an image processor 33. The image processor 33 executes various kinds of processing such as gamma correction, undercolor removal (UCR) and color correction with the R, G and B image data. The image processor 33 has a delay memory 34 for delaying the input by an amount corresponding to the distance between nearby drums of the printer section 3. A printer control 36 modulates the individual laser beam emitting units on the basis of Y, M, C and Bk image data so as to reproduce an image on a paper sheet by an electrophotographic procedure.

Preferred embodiments of the image recording apparatus in accordance with the present invention will be described hereinafter. It is to be noted that the processing circuit which will be described with reference to the drawings is built in the image processor 33, FIG. 5.

FIRST AND SECOND EMBODIMENTS

Figure 6:
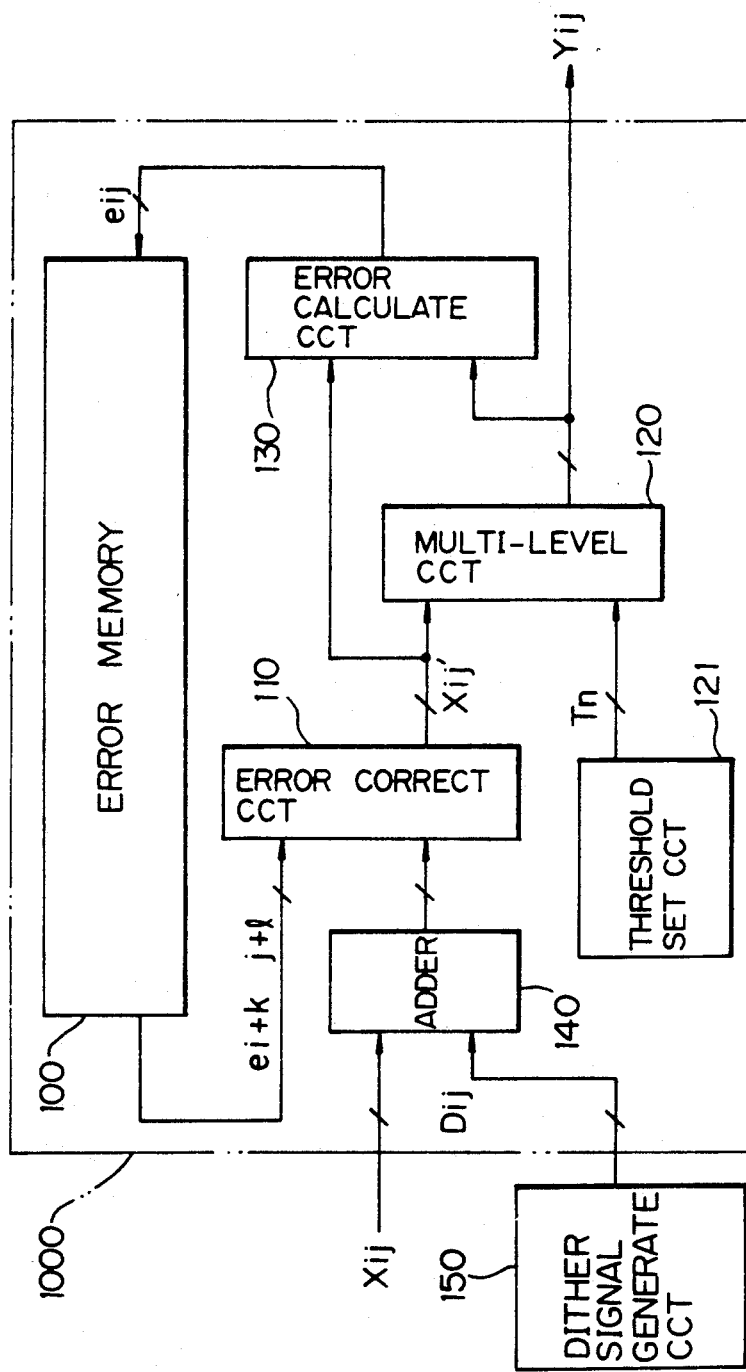
FIG. 6 is a block diagram schematically showing the construction of a major part a first embodiment of the present invention.
Figure 7:
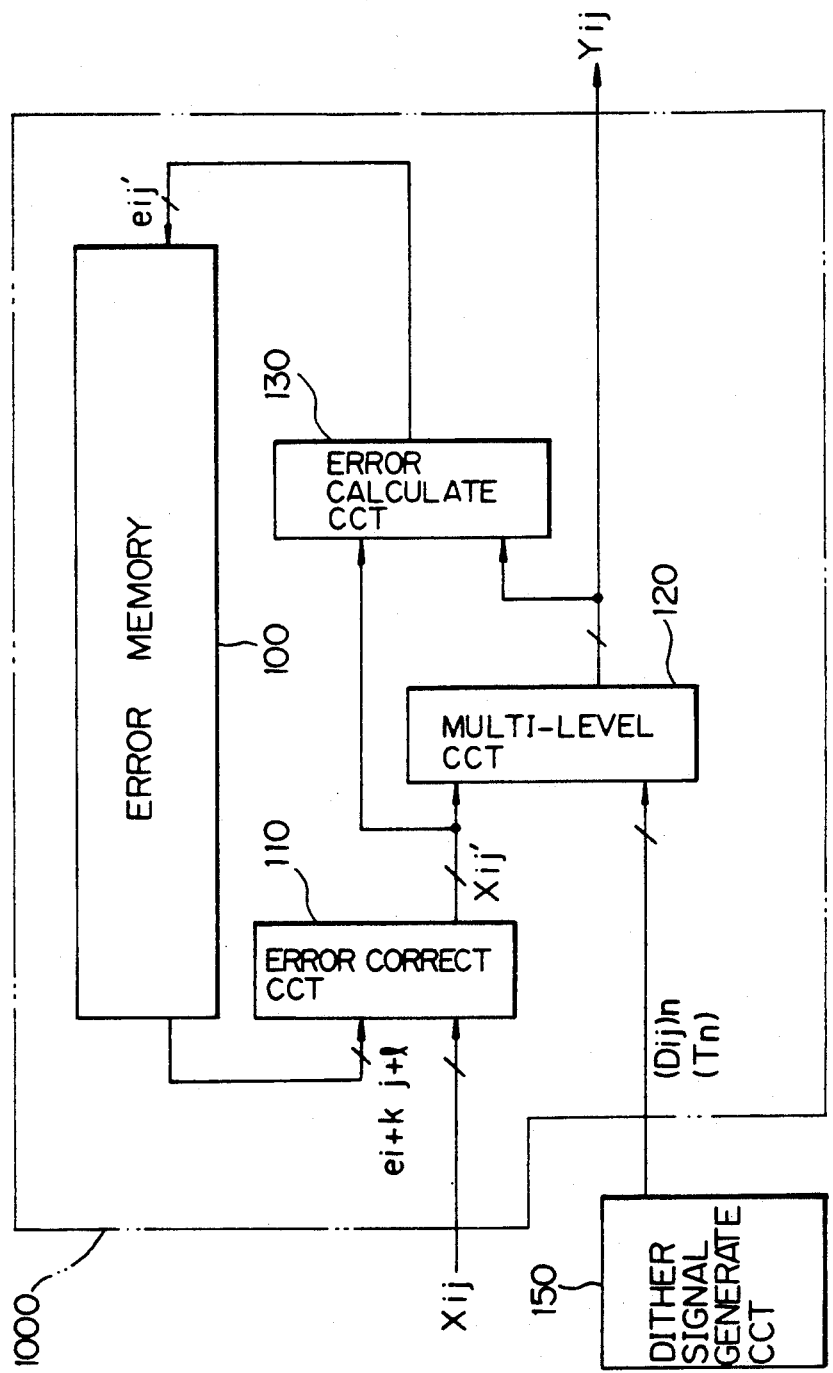
FIG. 7 is a block diagram schematically showing the construction of a major part of a second embodiment of the present invention.

FIGS. 6 and 7 show a first and a second embodiment of the present invention, respectively. Specifically, FIG. 6 shows a tone processing circuit constructed to add a dither signal to an input signal while FIG. 7 shows a toner processing circuit constructed to transform an input signal into multi-level data by a dither signal. The tone processing circuit of FIG. 6 has a dither signal generating circuit 150 and an adder 140 in addition to the prior art tone processing circuit, FIG. 1, which has the error memory 100, error correcting circuit 110, a multi-level circuit 120, and error calculating circuit 130. The tone processing circuit of FIG. 7 has only a dither signal generating circuit 150 in addition to the prior art circuit, FIG. 1.

Figure 8:
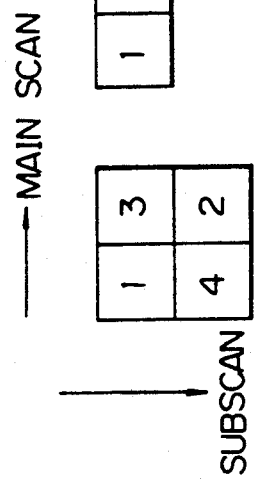
FIG. 8 shows specific dither matrixes applicable to dither signal generating circuits shown in FIGS. 6 and 7.

FIG. 8 shows specific dither matrixes applicable to the dither signal generating circuit 150. Specifically, dither matrixes (a1) to (a6) and dither matrixes (b1) to (b6) are applicable to the second and first embodiments, respectively. In each of the dither matrixes (b1) to (b6), the sum of the elements is zero. The individual matrix data may be used after being multiplied in matching relation to the number of tones of the input signal (e.g. 64 tones in the case of 6-bit data).

Figure 9:
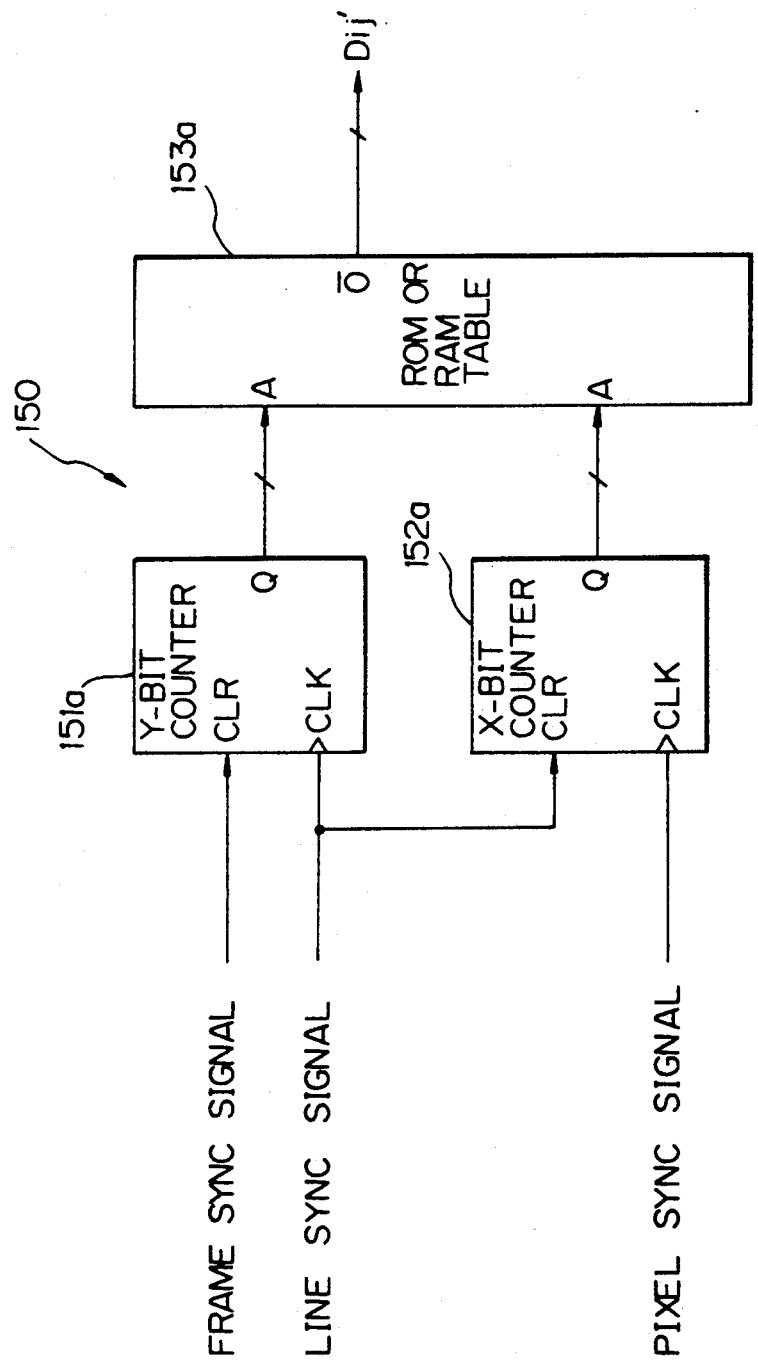
FIG. 9 is a diagram showing a specific construction of the dither signal generating circuits of the illustrative embodiments.

A specific construction of the dither signal generating circuit 150 is shown in FIG. 9. As shown, the circuit 150 has a memory table 153a loaded with dither signal data sized X×Y, a Y-bit counter 151a, and an X-bit counter 151b.

Figure 10:
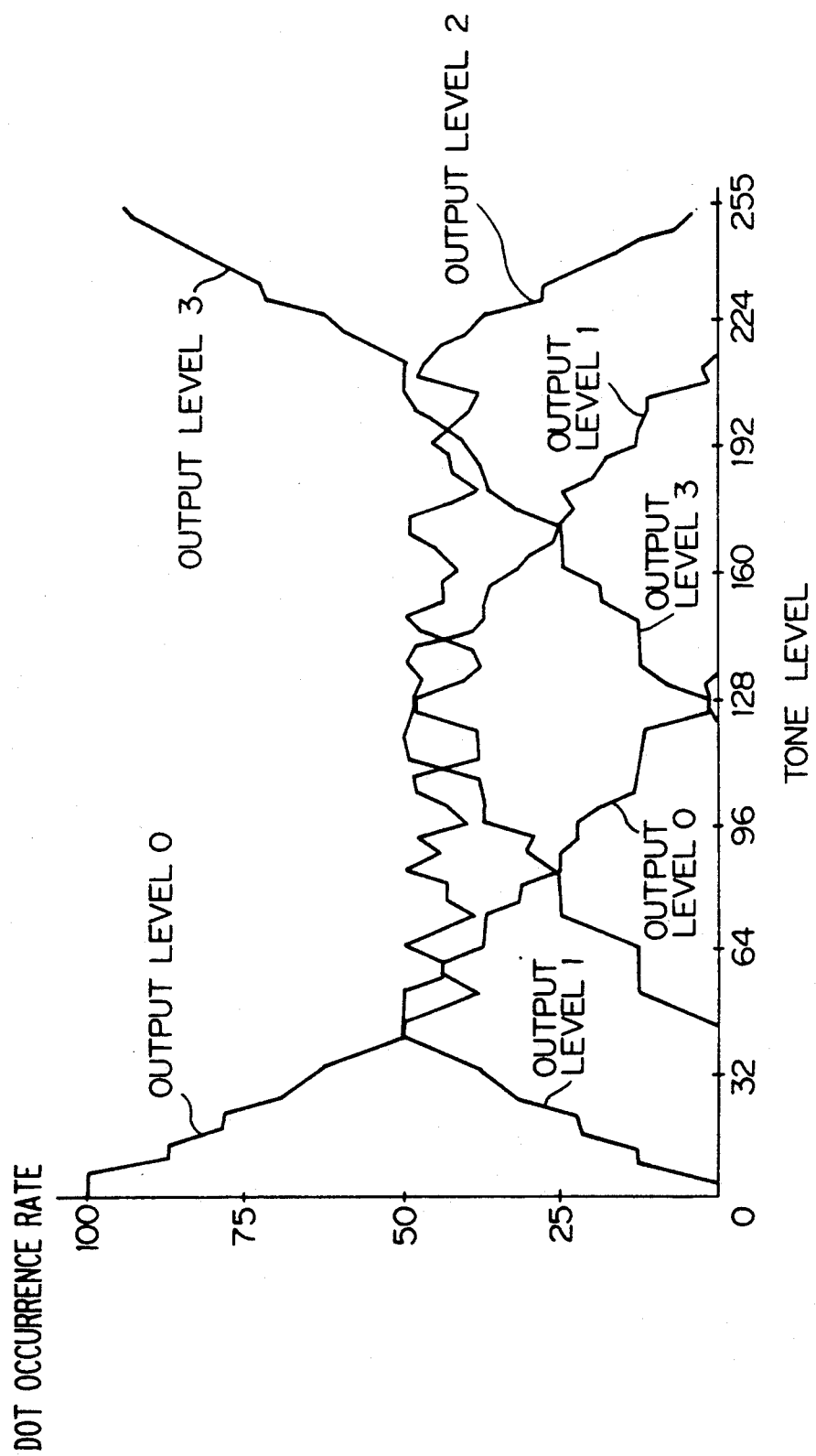
FIG. 10 is a graph representative of the gray scale tone characteristic particular to the embodiments of FIGS. 6 and 7.

When a dither signal is introduced, the tone reproducibility of gray scale varies as shown in FIG. 10. The graph of FIG. 10 was obtained with the same gray scale data, error weighting matrix and threshold values as those of FIG. 3. Use was made of a dither signal which was produced by multiplying the individual elements of the matrix (b5), FIG. 8, by 12. The amplitude of the dither signal is 84 which is about the same as the distance between the threshold values. As FIG. 10 indicates, the dither signal is effective to render each tone level by dots of two to three kinds of output values. By using systematic patterns, it is possible to form uniform texture and, therefore, to reproduce tones which are pleasant to the eye.

THIRD EMBODIMENT

A third embodiment is implemented by the same circuitry as the circuitry of FIG. 1, but the former is different from the latter with respect to the threshold values applied to the multi-level circuit 120. In this embodiment, the multi-level circuit 120, FIG. 1, optimizes the distance between the threshold values so as to control the occurrence rate of dots of the individual output levels. In the formula (4), let the distance between the threshold values T1 to Tm be represented by $\Delta T$. When multi-level processing is executed according to the formula (4), the resulting error is expressed as:

$$0 \leq eij \leq \Delta T - 1 \tag{6a}$$

Therefore, $$0 \leq X\ X'ij - Xij \leq \Delta T - 1 \tag{6b}$$

It follows that there exists n which satisfies a relation:

$$Tn \leq Xij \leq X'ij \leq Xij + (\Delta T - 1) < Tn_{+1} + (\Delta T - 1) < Tn_{+1} \tag{6c}$$

Hence, it will be seen that any input tone can be rendered only by two kinds of dots, i.e., a minimum output value Tn above the level of the input tone and $Tn_{+1}$. When Xij is close to Tn, the errors $ei_{+}kj_{+}1$ of the surrounding pixels decreases the area where the density changes slowly and, therefore, the probability that the corrected X'ij exceeds $Tn_{+1}$ decreases. Such a range can be almost rendered only by the dots of output level Tn. In FIG. 3, the conditions selected were m=3, T1=85, ΔT=85, Tn=Ln, and 255>Xij>0. In this manner, when the number of output levels is small, an area rendered by dots of a single output level over a substantial part thereof is apt to occur in a photographic image or similar image in which the slow change of density is predominant. Such an area will be recognized as a false contour since it greatly differs in texture from the area rendered by dots having a plurality of output levels.

The occurrence stated above is accounted for by the large ΔT. Hence, it may be contemplated to reduce ΔT. While in the formula (4) the output values of the individual dots are used as the threshold values, it is not necessary to equalize the output vales and the threshold values. Concerning the error scattering method, an error particular to a certain pixel is corrected with no regard to the size of the error and, therefore, a desired tone can be rendered in the macroscopic sense. Hence, assuming that the value which Yij may assume is Ln, let the formula (4) be rewritten as follows:

$$Yij = Lm \quad \text{if } X'ij \geq Tm \quad (7)$$
$$Yij = Lm_{-1} \quad \text{if } Tm > X'ij \geq Tm_{-1}$$

$$Yij = L1 \quad \text{if } T2 > X'ij \geq T1$$
$$Yij = L0 \quad \text{if } T1 > X'ij$$

The occurrence rate of dots of the individual output levels is controlled by isolating the threshold values Tn from the output values Ln of the dots and by reducing the distance ΔT between the threshold values. Although Tn and Ln do not have to have equal distances, assume that the threshold values Tn and the output values Ln of dots have equal distances ΔT and ΔL, respectively. When multi-level processing is effected by using the formula (7), an error occurring when X'ij has a relation (8a) is represented by an equation (8b):

$$Tn \leq X'ij < Tnn_{+1} \quad (8a)$$

$$eij = X'ij - Ln \quad (8b)$$

Hence, $$Tn - Ln \leq eij < Tn_{+1} - Ln \quad (8c)$$

Since Tn and Ln may be set independently of each other, the range in which the error lines greatly varies depending on the value n. It is possible, therefore, to set Tn and Ln such that dots having a plurality of output levels appear even in the image area where the change of density is slow. As the formula (7) indicates, selecting small ΔT reduces the possibility that the output values are representative of dots of medium levels L1 to $Lm_{-1}$, i.e., increases the possibility that they are representative of dots of output values L0 and Lm.

Figure 11:
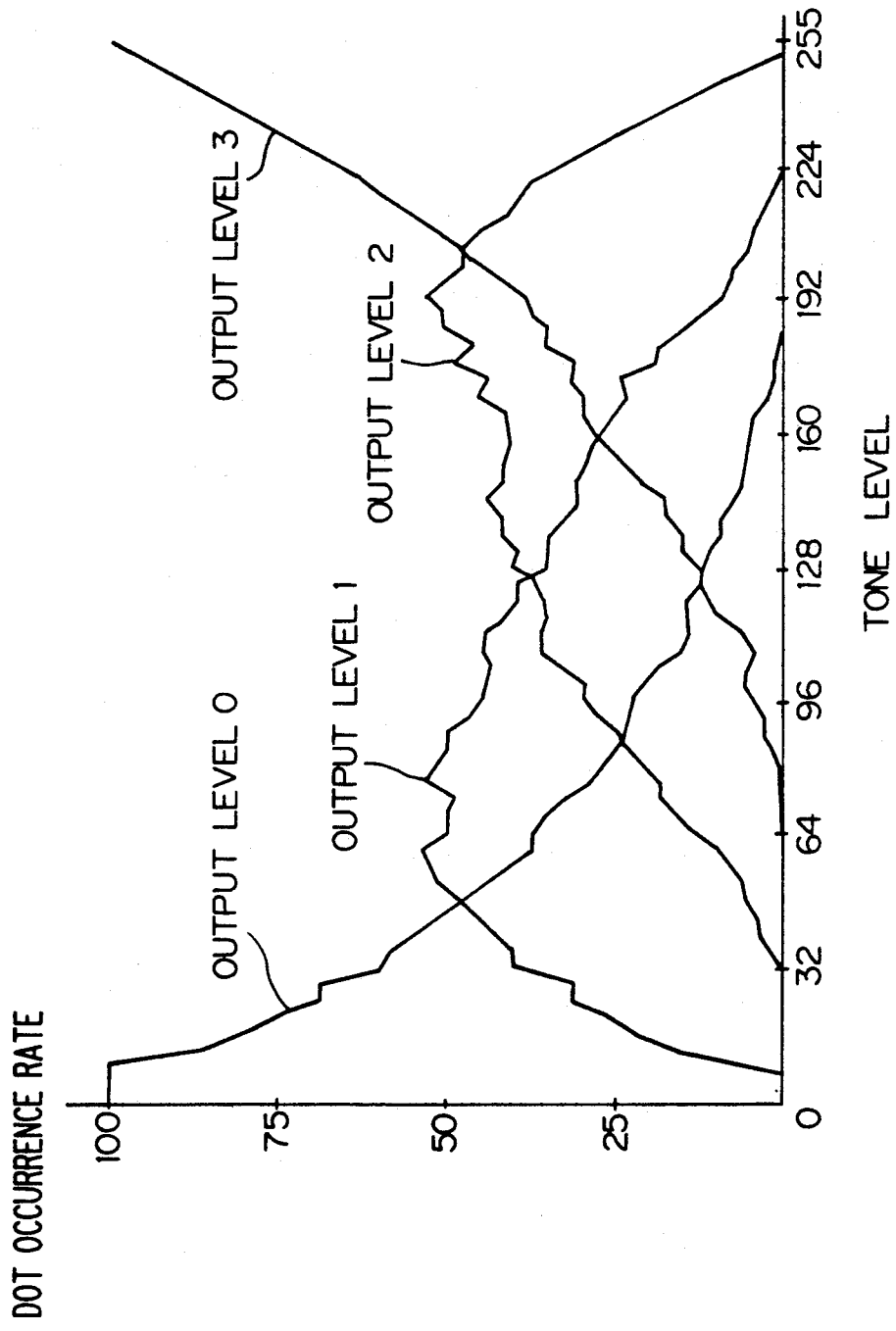
FIGS. 11 and 12 are graphs each showing a particular tone characteristic associated with a particular parameter shown in FIG. 10.

In the prior art processing shown in FIG. 3, the conditions are m=3, Tn=Ln, L0=0, and ΔT=85. When ΔT was selected to be 20 and 5, this embodiment yielded the results shown in FIGS. 11 and 12, respectively. In both the FIGS. 11 and 12, L0 is zero and ΔL is 85. When the error is corrected by 100%, the absolute values of Tn do not form a significant texture since dots of low levels and dots of a plurality of output levels are uniformly mixed together in the areas around a pixel at which processing is to begin. Hence, when a photographic image having continuous tones is processed under the above condition, extremely smooth changes of density can be reproduced.

Figure 12:
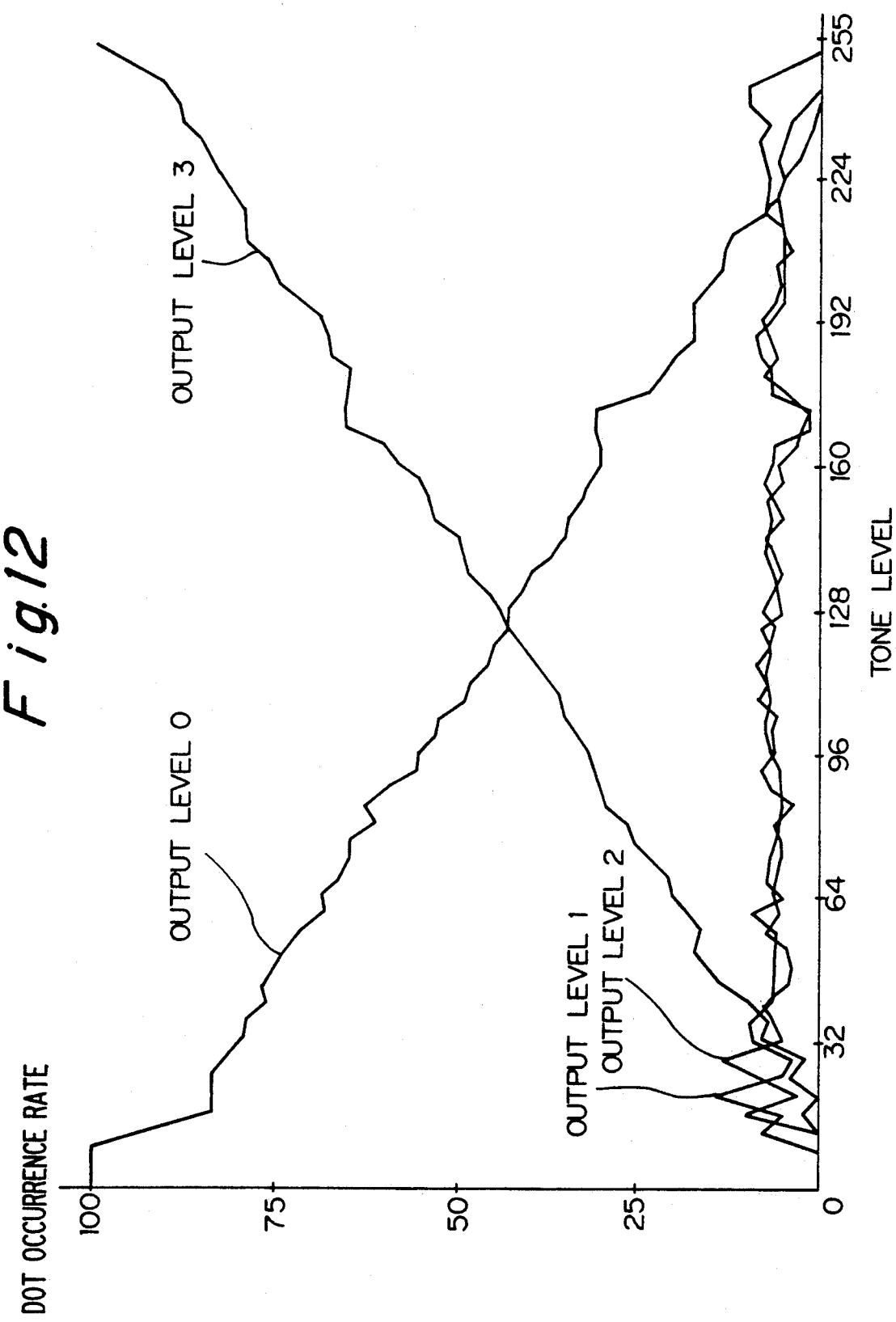

When ΔT is 5 as shown in FIG. 12, the occurrence rate of dots of medium levels is as low as about 10%, i.e., two kinds of dots L0 and Lm are predominant. The resultant image quality is similar to the quality particular to the two-level error scattering method.

The relation between ΔT and the dot occurrence ratio depends on the multi-level value m+1, the distance of output values Ln, the configuration of the weight matrix α, etc. Therefore, desirable results of processing will be achieved if the occurrence rate of dots of at least one kind of medium level ranges from 20% to 80% in matching relation to the above-mentioned parameters.

Another advantage of the third embodiment is that selecting adequately small ΔT enhances sharpness. Generally, an input image is blurred compared to an original image since an image reading device whose aperture has a finite extent and since the MTF (Modulation Transfer Function) characteristic of optics deteriorates with the increase in spatial frequency. In the light of this, it has been customary to emphasize high-frequency components (edges) by use of a digital filter which subtracts Laplacian from original image data. Such a digital filter, however, needs multiplying and adding circuitry and several lines of memories, resulting in an increase in cost. With the illustrative embodiment, it is possible to reproduce a sharp image free from blurring without resorting to an expensive digital filter.

Figure 13:
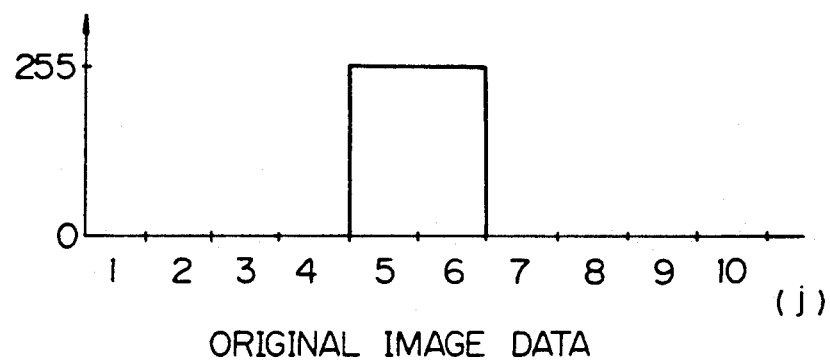
FIG. 13 is a gram representative of image data of a document.
Figure 14:
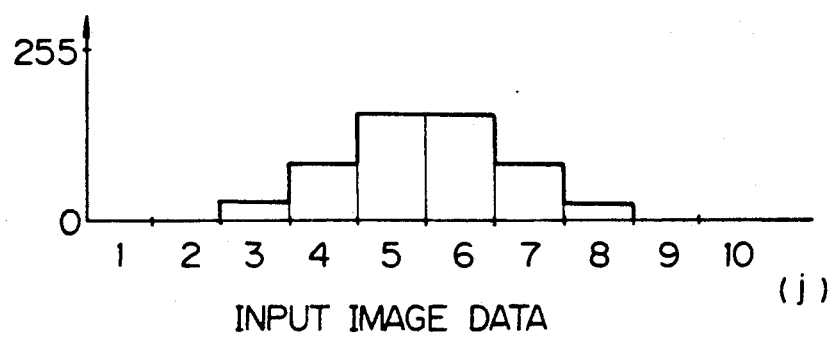
FIG. 14 is a graph associated with FIG. 13, showing image data inputted to the prior art apparatus.

The edge emphasizing effect will be described in relation to a one-dimensional image for simplicity. As shown in FIG. 13, assume an original image which extends over two pixels and is a two-level image, i.e. a black image or a white image. FIG. 14 shows data produced by reading the original image of FIG. 13. The image represented by such data is blurred for the previously stated reasons.

TABLE 1

| WEIGHT MATRIX α | →i | | |
|---|---|---|---|
| | 1 | 2 | * |

(*: position of pixel of interest
Σαi = 3)

| | | |
|---|---|---|
| OUTPUTS Ln OF DOTS THRESHOLD GROUP | L3 = 225<br>L1 = 85<br>(prior art)<br>T3 = 213<br>T2 = 128<br>T1 = 43<br>ΔT = 85 | L2 = 170<br>L0 = 0<br>(3rd embodiment)<br>T3 = 148<br>T2 = 128<br>T1 = 108<br>ΔT = 20 |

TABLE 2a

| PIXEL NO. i | 1 | 2 | 3 | 4 | 5 | 6 | 7 | 8 | 9 | 10 |
|---|---|---|---|---|---|---|---|---|---|---|
| ORIGINAL DENSITY LEVEL | 0 | 0 | 0 | 0 | 255 | 255 | 0 | 0 | 0 | 0 |

TABLE 2b

| PIXEL NO. i | 1 | 2 | 3 | 4 | 5 | 6 | 7 | 8 | 9 | 10 |
|---|---|---|---|---|---|---|---|---|---|---|
| INPUT SIGNAL Xi | 0 | 0 | 20 | 80 | 155 | 155 | 80 | 20 | 0 | 0 |

TABLE 2c

| PIXEL NO. i | 1 | 2 | 3 | 4 | 5 | 6 | 7 | 8 | 9 | 10 |
|---|---|---|---|---|---|---|---|---|---|---|
| CORRECTION AMOUNT | 0 | 0 | 0 | 13 | 12 | 1 | −10 | −16 | −2 | 0 |
| CORRECTED VALUE Xi' | 0 | 0 | 20 | 93 | 167 | 156 | 70 | 4 | −2 | 0 |
| OUTPUT VALUE Yi | 0 | 0 | 0 | 85 | 170 | 170 | 85 | 0 | 0 | 0 |
| ERROR ei | 0 | 0 | 20 | 8 | −3 | −14 | −15 | 4 | −2 | 0 |

TABLE 2d

| PIXEL NO. i | 1 | 2 | 3 | 4 | 5 | 6 | 7 | 8 | 9 | 10 |
|---|---|---|---|---|---|---|---|---|---|---|
| CORRECTION AMOUNT | 0 | 0 | 0 | 13 | 69 | 17 | −62 | −16 | 9 | 7 |
| CORRECTED VALUE Xi' | 0 | 0 | 20 | 93 | 224 | 172 | 18 | 4 | 0 | 7 |
| OUTPUT VALUE Yi | 0 | 0 | 0 | 0 | 255 | 255 | 0 | 0 | 0 | 0 |
| ERROR ei | 0 | 0 | 20 | 93 | −21 | −83 | 18 | 4 | 9 | 7 |

The blurred image, or input signal data, is subjected to tone processing which uses the parameters shown in Table 1 and the 4-level error scattering method.

Figure 15:
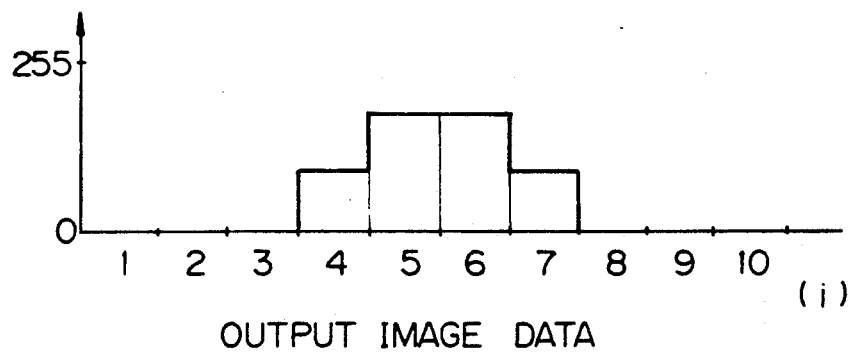
FIG. 15 is a graph showing output image data particular to the prior art apparatus.
Figure 16:
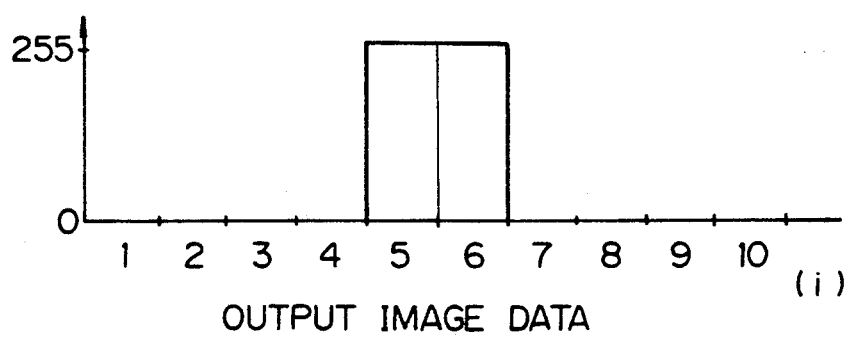
FIG. 16 is a graph showing image data outputted by the embodiments of FIGS. 6 and 7.

FIGS. 15 and 16 show respectively the output image data particular to the prior art method and the output image data achievable with this embodiment. The difference between the prior art method and the illustrative embodiment is that ΔT is 85 in the former and 20 in the latter. Tables 2a to 2d indicate image data before and after the processing and errors, corrected values and other data which are developed during the course of processing. As FIG. 15 indicates, the prior art method reproduces blurring faithfully together with an input image. As shown in FIG. 16, the illustrative embodiment reproduces an image closer to the original image by correcting the blur, i.e., by emphasizing the edges. More specifically, with small ΔT, it is possible to emphasize the characteristic that output dots of higher levels are allocated to pixels having higher density levels than surrounding pixels, while output dots of lower levels are allocated to pixels having lower density levels. Stated another way, the contrast is emphasized in the microscopic sense so that when an input image is blurred, sharpness is enhanced in the macroscopic sense by correcting the spread of blurring to the surrounding pixels.

FOURTH AND FIFTH EMBODIMENTS

Figure 17:
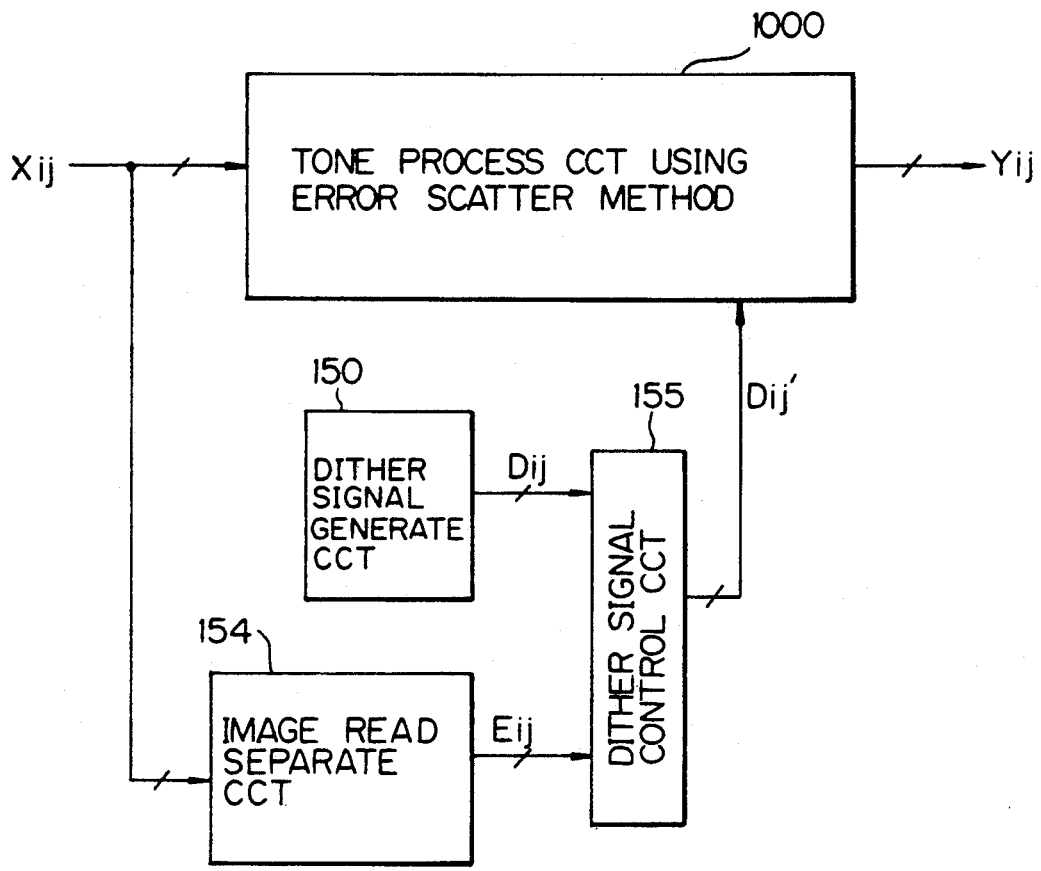
FIG. 17 is a block diagram showing an essential part of a fourth and a fifth embodiment of the present invention.

FIG. 17 shows circuitry for implementing a fourth and a fifth embodiment of the present invention. It is to be noted that the circuitry, generally 1000, shown in FIG. 17 is constructed and arranged as shown in FIG. 6 for the fourth embodiment or as shown in FIG. 7 for the fifth embodiment. As shown, the circuitry 1000 of FIG. 17 has a dither signal generating circuit 150, a dither signal control circuit 155, and an image area separating circuit 154 in addition to the components of the prior art circuitry shown in FIG. 1. The image area separating circuit 154 discriminates images having continuous tones and two-level images such as halftone images, character images and line images, thereby outputting a decision signal Eij. The decision signal Eij is 0 representative of an image having continuous tones or 1 representative of a two-level image. The dither signal control circuit 155 outputs $D'_{ij}=0$ when $E_{ij}=0$ or $D'_{ij}=D_{ij}$ (output of dither signal generating circuit) when $E_{ij}=1$.

Figure 18:
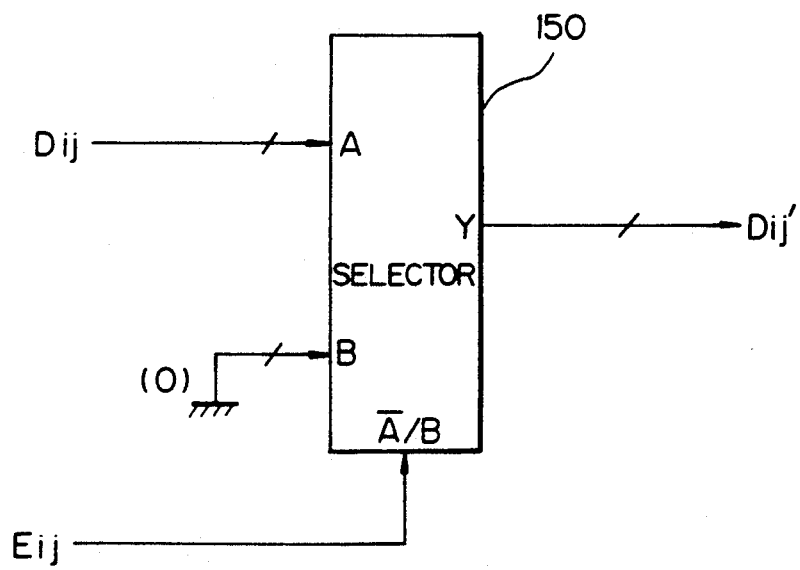
FIG. 18 is a diagram showing a specific construction of a dither signal control circuit of FIG. 17.

A specific construction of the dither signal control circuit 155 is shown in FIG. 18. As shown, the circuit 155 is a selector and selects either one of $D_{ij}$ and 0 according to $E_{ij}$. While $E_{ij}$ is a two-level signal in the specific construction, the characteristics of an input image may be evaluated continuously so as to control the dither signal continuously with respect to multiple levels. The multi-level control of the dither signal is successful in reducing the probability that the image quality is degraded by erroneous discrimination by the image area separating circuit 154. Furthermore, since the processing can be changed smoothly along the border between image areas, a desirable image free from unnatural borders is achievable. For the multi-level control of dither signal, use may be made of a multiplier for producing a product of $D_{ij}$ and a predetermined coefficient which matches $E_{ij}$.

Figure 19:
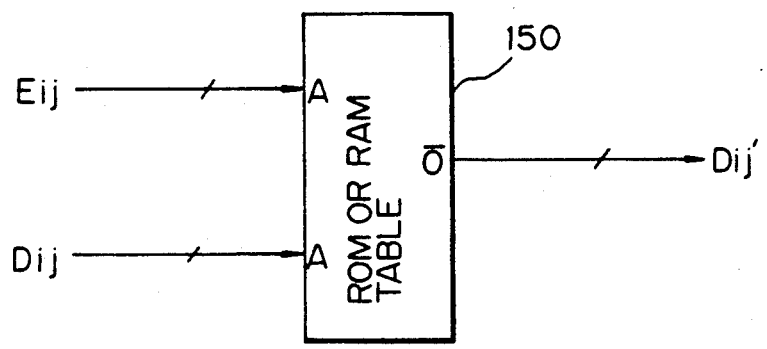
FIG. 19 is a diagram showing another specific construction of the dither signal control circuit.
Figure 20:
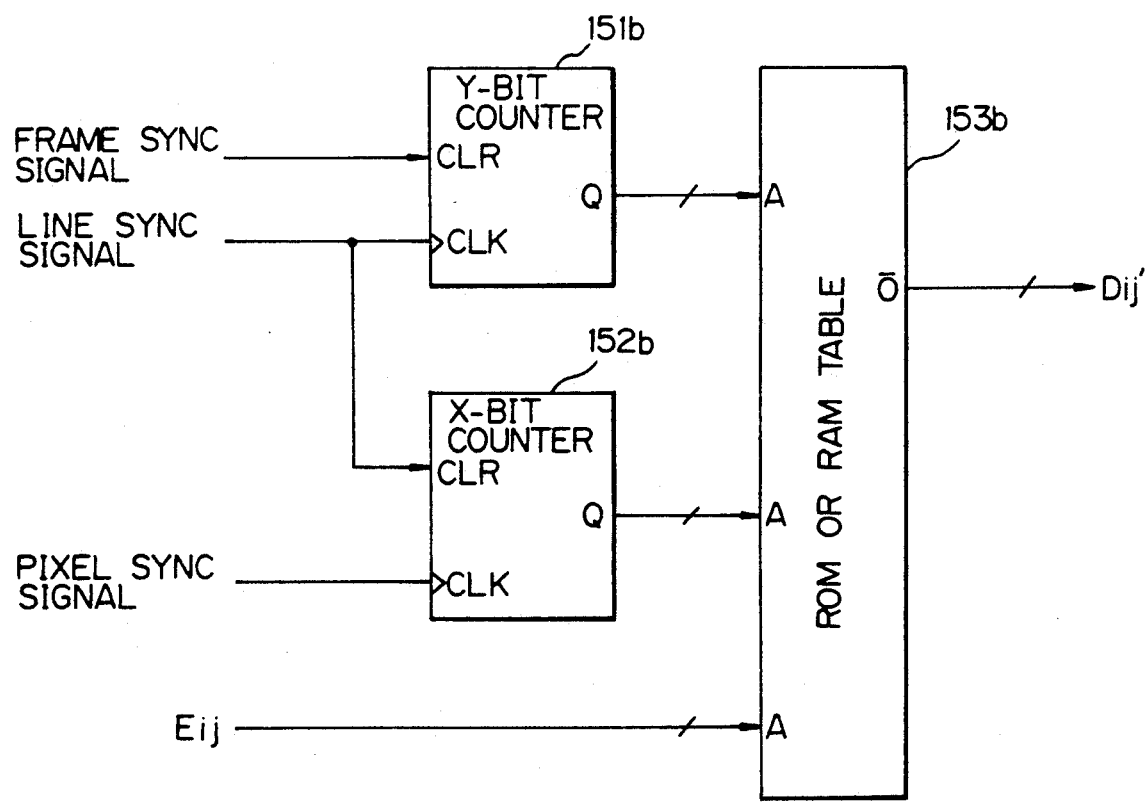
FIG. 20 is a diagram representative of the combination of the dither signal generating circuit and dither signal control circuit shown in FIG. 17.

FIG. 19 shows another specific construction of the dither signal control circuit which implements the multi-level control of dither signal more simply. Further, as shown in FIG. 20, a ROM table or a RAM table 153b having the dither signal generating circuit 150 and dither signal control circuit 155 integrally therewith may be used. Specifically, the capacity of the memory table of the dither signal generating circuit 150 may be increased to constitute the table 153b, in which case $E_{ij}$ will be used as a part of the memory address signal.

When the image area separating circuit 154 has detected a two-level image, the error scattering method similar to the prior art (FIG. 1) is executed with the circuitry 1000 of FIG. 17. This enhances the resolution and reproduces attractive character and line images. Concerning two-level images, the dither signal essentially is not used so that even halftone images can be reproduced without moire. Nevertheless, superposing a weak dither signal on a two-level image serves to further enhance the tone reproducibility of an image having continuous tones and thereby to increase the allowable degree of the optimum value of ΔT. In this instance, since the amplitude of the dither signal only needs be smaller than in the case wherein the prior art error scattering method is applied to a two-level image, a halftone image is free from moire which offends the eye while the resolution is little lowered. Hence, stable images are achievable at all times with no regard to the characteristics of an input image. Specifically, in the fourth embodiment, the threshold values Tn will be so set in the circuitry 1000 (FIG. 6) as to satisfy predetermined ΔT while, in the fifth embodiment, the dither threshold values (Dij) n will be so set in the circuitry 100 (FIG. 7) as to satisfy predetermined ΔT.

SIXTH, SEVENTH AND EIGHTH EMBODIMENTS

The third embodiment enhances sharpness, as stated earlier. However, it is sometimes desired to reproduce an image while preserving low sharpness. It has been customary to change sharpness by use of a digital filter operable with various MTF characteristics. The digital filter subjects input image data to smoothing or edge emphasizing processing. The problem with a digital filter with variable characteristics is that the circuit arrangement is complicated and expensive. In the sixth, seventh and eight embodiments, the processing parameter for the multi-level error scattering method is variable to allow an output image with desired sharpness to be produced with ease.

An image recording apparatus with variable sharpness would be realized if the threshold value group Tn were freely selectable by the operator. Although this scheme may be useful with halftone images and character and line images, it brings about a problem when it comes to an image having continuous tones. Specifically, when Tn is so set as to lower the sharpness of an image having continuous tones, the problem particular to the prior art as discussed earlier is brought about. In the light of this, the sixth, seventh and eighth embodiments each is constructed to prevent Tn from being matched to low sharpness when an image with continuous tones appears or, when Tn is matched to low sharpness, to increase the amplitude of the dither signal. This is achievable with the image area separating circuit 154.

Figure 21:
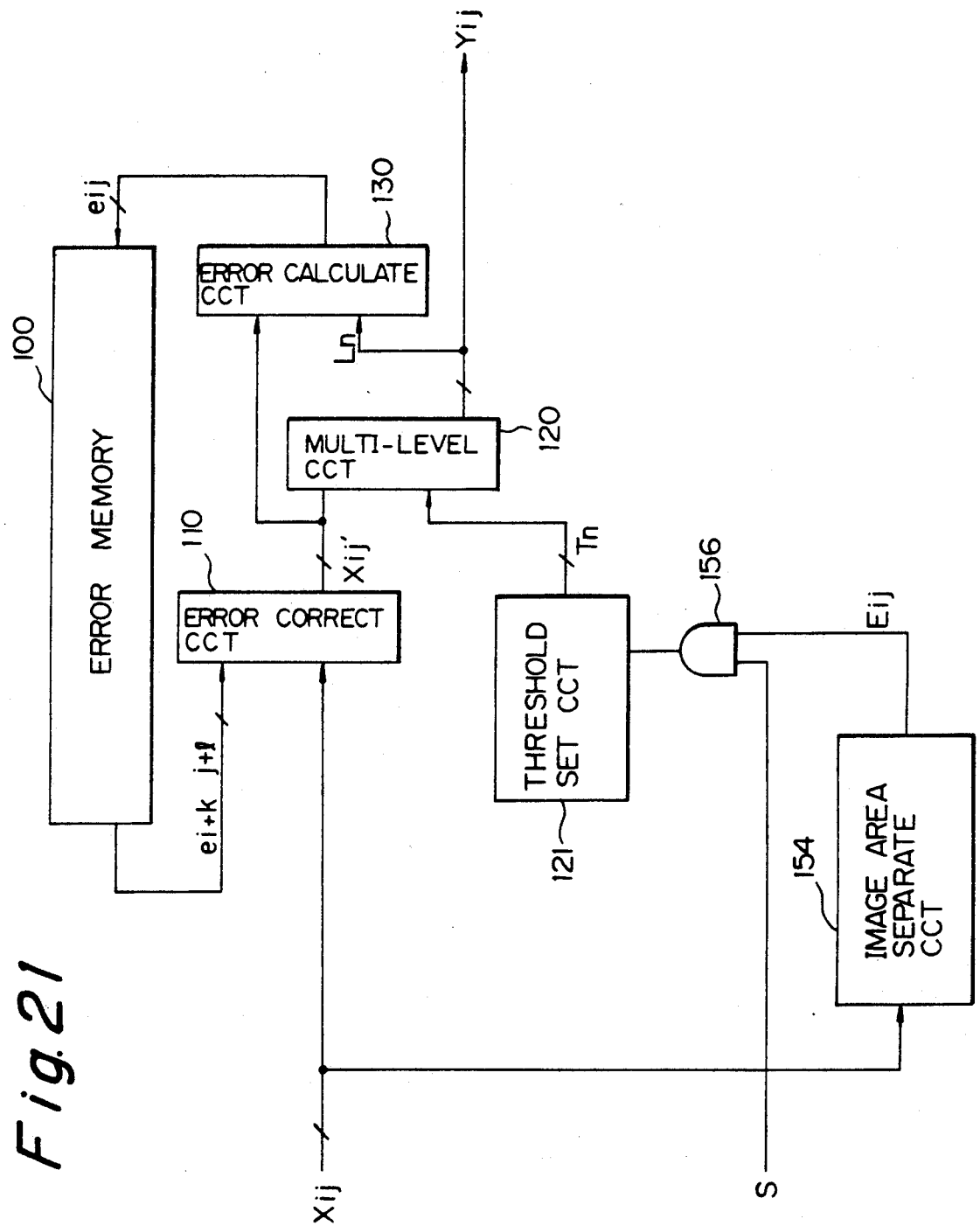
FIG. 21 is a block diagram showing an essential part of an eighth embodiment of the present invention.

Referring to FIG. 21, the eight embodiment is shown and selects the same threshold value group Tn as the third embodiment when low sharpness is not selected. When low sharpness is selected, this particular embodiment invalidates a low sharpness selection signal S ("select" when 1) in an image area with continuous tones (Eij=0) to thereby maintain Tn assigned to high sharpness (small ΔT).

Figure 22:
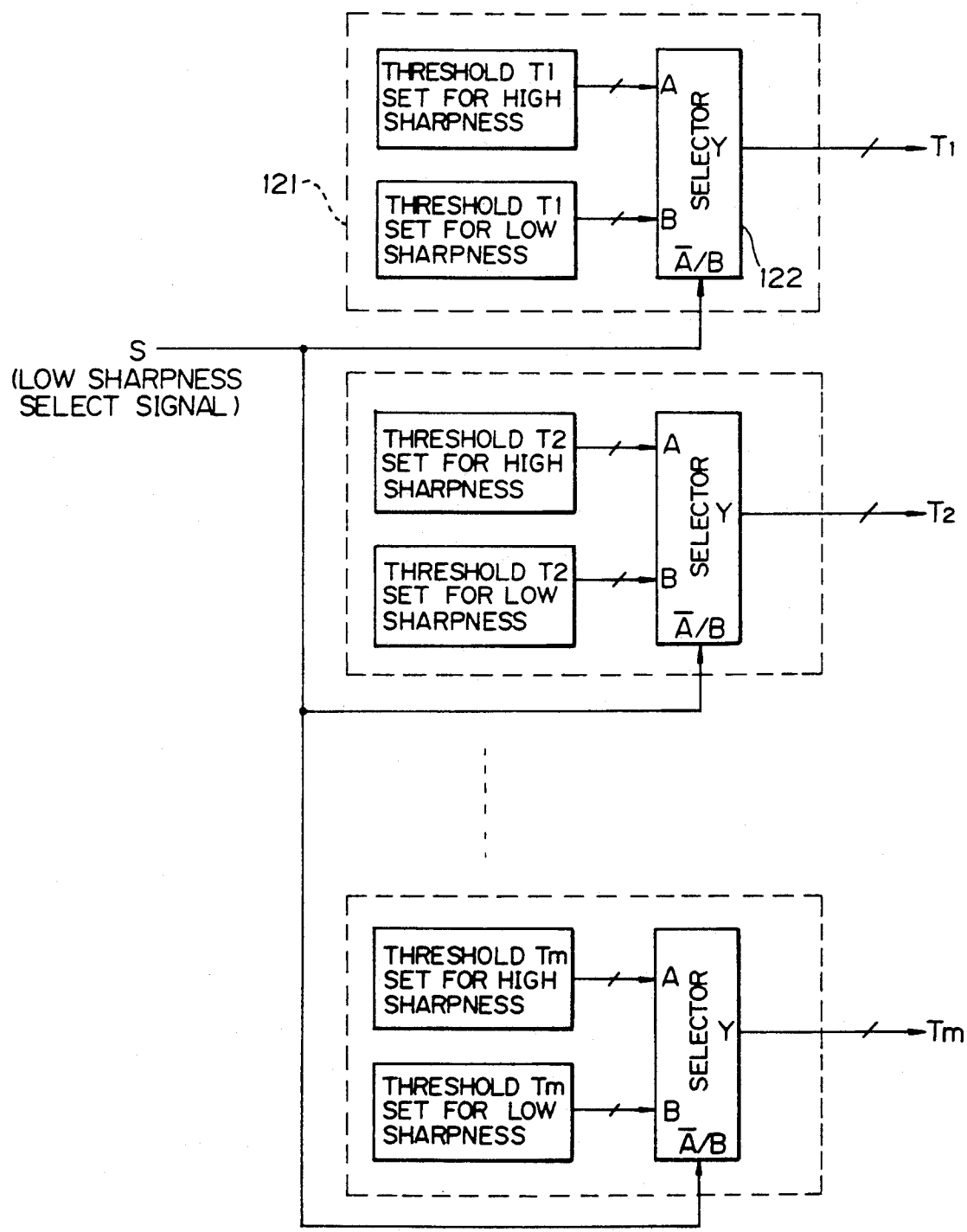
FIG. 22 is a block diagram showing a specific construction of a threshold setting circuit of FIG. 21.

FIG. 22 shows a specific construction of a threshold setting circuit 121 included in the circuitry of FIG. 21. As shown, m selectors are used to select either threshold values assigned to low sharpness or those assigned to high sharpness in response to the low sharpness selection signal S, whereby a threshold group Tl to Tm is fed to the multi-level circuit 120. The threshold setting unit may be loaded with fixed values or may be provided with dip switches. Alternatively, use may be made of flip-flops to allow the operator to freely select threshold values on an operation board via a CPU. If desired, three or more different kinds of threshold value groups may be used.

With the sixth and seventh embodiments, it is also possible to increase the sharpness even with an image having continuous tones if the amplitude and/or the dither pattern of the dither signal is variable. Specifically, even when Tn assigned to high sharpness is maintained, the resolution and, therefore, the sharpness will be lowered if the amplitude of the dither signal is increased. The sharpness is also variable by varying the size and/or layout of the dither matrix, as shown in FIG. 8.

In FIG. 8, the patterns (b1) to (b4) shown in FIG. 8, i.e., so-called dot decentralized patterns provide high sharpness while the patterns (b5) and (b6), so-called dot centralized patterns provide low sharpness. Increasing the amplitude of the dither aggravates moire in the case of halftone images or aggravates blurring in the case of character and line images. A prerequisite is, therefore, that the dither signal be not superposed or be reduced for halftone, character and line images. To meet this prerequisite, the illustrative embodiment controls the dither signal generating circuit 150 and threshold setting circuit 121 by using the sharpness selection signal S and image area separation signal Eij.

FIG. 26 shows circuitry representative of the sixth embodiment. When the image area separating circuit 154 determines that the input image has continuous tons, Eij=0 is produced to invalidate the low sharpness selection signal S which is fed to the threshold setting circuit 121. Conversely, when the input image is a halftone, character or line image as determined by the circuit 154, Eij turns from 0 to 1 to invalidate the low sharpness selection signal which is fed to the dither signal generating circuit 150. Alternatively, the signal S and the signals S and Eij may each be implemented as a multi-level signal for controlling Dij and Tn accordingly, thereby varying the sharpness continuously.

Figure 23:
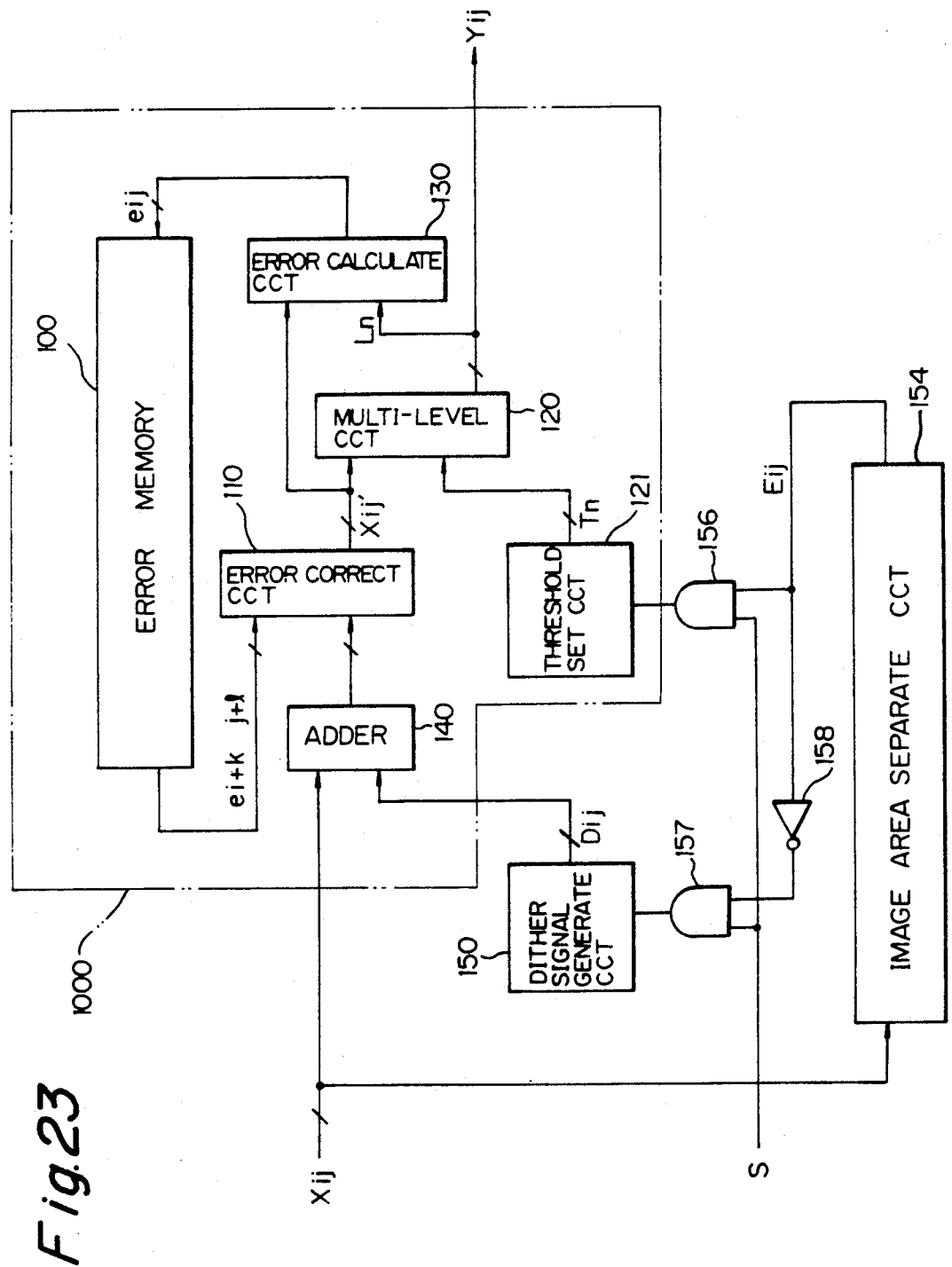
FIG. 23 is a block diagram showing an essential part of a sixth embodiment of the present invention.

For the seventh embodiment, the circuitry 1000 shown in FIG. 23 is replaced with the circuitry 1000 shown in FIG. 7.

The first to eighth embodiments will be described more specifically. In the first, second, fourth, fifth, sixth and seventh embodiments, the dither method is used in combination with the error scattering method to superpose a systematic dither signal on input image data, so that the texture is varied uniformly and smoothly. Since these embodiments are the improvements over the error spreading method, they differ from the simple systematic dither method in that the number of tones which can be rendered does not depend on the size of the dither matrix. Hence, a dither pattern having a relatively small size such as 2×2 pixels or 3×3 pixels is usable. This, coupled with the fact that the amplitude of the dither signal needs only be of the order of the difference (distance) between output levels, allows a minimum of fall of resolution to occur despite the introduction of the dither method. The dither method is selectively practicable in either one of two different procedures: the manner particular to the first, fourth and sixth embodiments and which adds a dither signal to an input image signal (or, in effect, subtracts when the dither signal is negative), corrects the sum by the error spreading method, and then processes it by use of two or more threshold values, and the manner particular to the second, fifth and seventh embodiments and which corrects an input image signal by the error scattering method and then processes the corrected signal by use of two or more groups of dither signals. Such two different procedures are equivalent concerning the result.

The first and second embodiments are feasible for an image having continuous tones and advantageous over the systematic dither method as to resolution. However, they are not satisfactory when it comes to the legibility and moire of a character, line, halftone or similar two-level image. With such a two-level image, importance is attached to the resolution and not to tone reproducibility because it is not likely that a halftone area extends over a broad range. Hence, an output image with relatively high resolution is achievable with the parameter of the prior art method. While a halftone image, like an image with continuous tones, needs accurate rendering of shades, superposing a systematic dither signal would cause a moire pattern to appear due to a periodic pattern particular to the halftone image and would thereby degrade the reproduced image. Macroscopically, a halftone image is a two-level or black-and-white image whose density sharply changes. Hence, even if such an image is processed by use of the parameter of the prior art method, desirable tone reproducibility is achievable with no area being rendered by dots of a single output level.

In the light of the above, the fourth and fifth embodiments each adaptively executes the image processing particular to the first and second embodiments with an image having continuous tones or the image processing particular to the first and second embodiments with a halftone, character or line image. This insures desirable output images at all times. Switching the processing method adaptively as mentioned above is not practicable without resorting to so-called image area separating means which has been proposed in various forms in the past. Separating a halftone image and a character or line image is not easy and needs a complicated and large scale arrangement to enhance accurate separation. However, all that is required with the above embodiments is separating an image with continuous tones and a halftone, character or line image. This can be done with relatively simple circuitry. For the separation of image areas, a method which uses an edge extracting filter is available, as disclosed in Japanese patent application No. 19873/1989, for example.

While the third embodiment is successful in enhancing sharpness by selecting adequately small $\Delta T$, it is sometimes desired to reproduce an image while preserving low sharpness. To change sharpness, it is a common practice to use a digital filter with a variable MTF characteristic. However, a digital filter with a variable MTF characteristic is complicated and expensive, as stated earlier.

To eliminate this problem, the sixth, seventh and eighth embodiments changes the processing parameter of the multi-level error scattering method and thereby readily produces an output image with desired sharpness.

An image recording apparatus with variable sharpness will be implemented if an arrangement is so made as to allow the operator to freely set or select the threshold group Tn. Although such a scheme is useful with a halftone, character or line image, setting Tn in such a manner as to lower the sharpness (selecting larger $\Delta T$) would bring about the problems particular to the prior art method. In the light of this, in the sixth, seventh and eighth embodiments, when an image with continuous tones appear as determined by tone sensing means (154), Tn is prevented from being matched to low sharpness or, when it is matched to low sharpness, the amplitude of the dither signal to be superposed is increased, as described previously.

In summary, the present invention achieves various unprecedented advantages, as enumerated below.

(1) The present invention allows the amplitude of a dither signal and a matrix size to be reduced, compared to the systematic dither method. This is successful in rendering the tones of an image having continuous tones with high resolution.

(2) With the edge emphasizing effect, the present invention records tones with excellent resolution.

(3) The present invention allows a processing parameter to be varied in response to input image data and, therefore, processes tones optimumly at all times with no regard to the kind of an image.

(4) Further, the present invention allows the processing parameter to be varied in matching relation to input data and sharpness selection signal, whereby sharpness can be changed without effecting the tone characteristic.

Various modifications will become possible for those skilled in the art after receiving the teachings of the present disclosure without departing from the scope thereof.

What is claimed is:

1. An image recording apparatus comprising:
   adding means for outputting a dither-processed signal by superposing on each two-dimensionally distributed m×n pixel group of an input image signal representative of tones m×n adjusting levels on a pixel-by-pixel basis;
   error correcting means for outputting an error scattered image signal by applying to said dither-processed signal a correction matching a signal level error between an input and an output of a pixel whose recording level has already been determined;
   multi-level converting means for converting said error scattered image signal into a multi-level tone recording signal by using at least two threshold levels; and
   recording means for recording an image represented by said tone recording signal.

2. An apparatus as claimed in claim 1, further comprising:
   tone detecting means responsive to the input image signal for determining whether an image represented by said input image signal is a tone image area or a two-level image area; and
   dither-process adjusting means for feeding to said adding means dither-process adjusting levels assigned to tone image processing when said tone detecting means detects a tone image area or dither-process adjusting levels assigned to two-level image processing when said tone detecting means has detected a two-level image area.

3. An apparatus as claimed in claim 1, further comprising:
   tone detecting means responsive to the input image signal for determining whether an image represented by said input image signal is a tone image area or a two-level image area;
   selecting means for selecting sharpness of an output image; and
   multi-level threshold value setting means for feeding to said adding means and said multi-level converting means, respectively, dither-process adjusting values and multi-level threshold values which are associated with determination by said tone detecting means and selection by said selecting means.

4. An image recording apparatus comprising:

error correcting means for outputting an error scattered image signal by applying to an input image signal representative of tones a correction matching a signal level error between an input and an output of a pixel whose recording level has already been determined;

dither/multi-level converting means for converting said error scattered image signal into a tone recording signal by processing each group of two dimensionally distributed $m \times n$ pixels of said image signal by corresponding threshold values of at least two threshold value groups each comprising $m \times n$ threshold values; and recording means for recording an image represented by said tone recording signal.

5. An apparatus as claimed in claim 4, further comprising:

tone detecting means for determining whether an image represented by the input image signal is a tone image area or a two-level image area; and dither-process adjusting means for feeding to said dither/multi-level converting means a threshold value group assigned to tone image processing when said detecting means has detected a tone image area or a threshold value group assigned to two-level image processing when said detecting means has detected a two-level image area.

6. An apparatus as claimed in claim 4, further comprising:

selecting means responsive to the input image signal for selecting sharpness of an output image; and multi-level threshold setting means for feeding to said multi-level converting means a threshold value group associated with determination by said tone detecting means and selection by said selecting means.

7. An image recording apparatus comprising:

error correcting means for outputting an error scattered image signal by applying to an input image signal representative of tones a correction matching a signal level error between an input and an output of a pixel whose recording level has already been determined;

multi-level converting means for converting said error scattered image signal into a multi-level tone recording signal by comparing said error scattered image signal with a plurality of threshold values having a distance which is smaller than a distance of recording levels; and recording means for recording an image represented by said multi-level tone recording signal.

8. An imge recording apparatus comprisin:

error correcting means for outputting an error scattered image signal in response to an input image signal representative of tones;

multi-level converting means for converting said error scattered image signal into a multi-level tone recoding signal by using at least two threshold values;

tone detecting means responsive to the input image signal for determining whether an image represented by said input image signal is a tone image area or a two-level image area;

selecting means for selecting sharpness of an output image;

multi-level threshold setting means for feeding to said multi-level converting means threshold values associated with determination by said tone detecting means and selection by said selecting means; and recording means for recording an image represented by said multi-level tone recording signal.

* * * * *